(12) United States Patent
Chen et al.

(10) Patent No.: US 7,633,958 B2
(45) Date of Patent: Dec. 15, 2009

(54) METHOD OF RESOURCE RESERVATION ACROSS A PLURALITY OF DOMAINS

(75) Inventors: Yuepeng Chen, Shenzhen (CN); Lingyuan Fan, Shenzhen (CN); Dengchao Wu, Shenzhen (CN); Bo Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 369 days.

(21) Appl. No.: 11/608,974

(22) Filed: Dec. 11, 2006

(65) Prior Publication Data

US 2007/0156905 A1    Jul. 5, 2007

Related U.S. Application Data

(63) Continuation of application No. PCT/CN2005/001634, filed on Sep. 30, 2005.

(30) Foreign Application Priority Data

Sep. 30, 2004    (CN)    .................. 2004 1 0081071

(51) Int. Cl.
*H04L 12/28* (2006.01)
(52) U.S. Cl. ...................................... 370/401; 370/230
(58) Field of Classification Search ................. 370/229, 370/230, 230.1, 235, 351, 357, 400, 401; 709/227–243
See application file for complete search history.

(56) References Cited

U.S. PATENT DOCUMENTS

2002/0114274 A1*    8/2002    Sturges et al. ............... 370/229
2003/0076815 A1*    4/2003    Miller et al. ................. 370/352
2003/0169726 A1    9/2003    Larsson et al.
2004/0215817 A1    10/2004    Qing et al. ................... 709/238

FOREIGN PATENT DOCUMENTS

EP    1 589 696    10/2005
JP    2004-254328    9/2004

(Continued)

OTHER PUBLICATIONS

International Search Report for International Application No. PCT/CN2005/001634, mailed Jan. 5, 2006.

(Continued)

*Primary Examiner*—Pankaj Kumar
*Assistant Examiner*—Gautam Sharma
(74) *Attorney, Agent, or Firm*—Marshall, Gerstein & Borun LLP

(57) ABSTRACT

The present invention discloses a method for implementing cross-domain resource management. If requesting for service connection resources, for each domain, a border Call Agent (CA) first sends a connection resource request to a specific bearer network resource manager in its domain. This bearer network resource manager decides whether the destination user's device is in its administration domain. If yes, it makes an appropriate processing and returns a response of a successful processing to the CA it belongs to; if not, the bearer network resource manager performs an appropriate preprocessing and sends back a response of a successful preprocessing to the CA it belongs to, and after receiving the response, the CA sends a connection resource request to its next-hop CA.

12 Claims, 3 Drawing Sheets

FOREIGN PATENT DOCUMENTS

| KR | 2002/093548 | 12/2002 |
|---|---|---|
| WO | WO 02/11461 | 2/2002 |
| WO | WO 2004/064325 | 7/2004 |

OTHER PUBLICATIONS

Mantar et al., "Interdomain Resource Reservation via Third-Party Agent," available at: http://www.hpdc.syr.edu/chapin/papers/pdf/SCIpaper_2001-haci.pdf.

Supplementary European Search Report for Application No. EP05795750, dated Jan. 11, 2008.

Non-Final Office Action for corresponding Japanese Patent Application No. 2007-516948, dated Jul. 22, 2009.

* cited by examiner

METHOD OF RESOURCE RESERVATION ACROSS A PLURALITY OF DOMAINS

CROSS-REFERENCES TO RELATED APPLICATIONS

This is a continuation of International Application No. PCT/CN2005/001634, which was filed on Sep. 30, 2005, and which, in turn, claimed the benefit of Chinese Patent Application No. 200410081071.5, which was filed on Sep. 30, 2004, the entire disclosures of which are hereby incorporated herein by reference.

BACKGROUND OF THE DISCLOSURE

1. Field of the Invention

The present invention relates to resource management technology, and more particularly, to a method for implementing cross-domain resource management.

2. Background of the Invention

With the expansion of the Internet, various network services as well as advanced multimedia systems are emerging. As being sensitive to some network characters such as transmission delay and time delay jittering, real time services will be greatly affected when there are services of high burstness transferred on the network, such as services based on File Transport Protocol (FTP) or Hypertext Transfer Protocol (HTTP). In addition, since multimedia services usually occupy large bandwidth, the key services of which the quality should be ensured actually cannot be transmitted reliably in the existing network. Therefore various technologies of Quality of Services (QoS) emerge to guarantee the reliable transmission of key services. Internet Engineering Task Force (IETF) has provided a lot of service models and mechanisms to satisfy the needs of QoS. The model currently ratified in this field includes an Integrated Service (Int-Serv) model employed in the access to or at the edge of a network, and a Differentiated Service (Diff-Serv) model used in the core of a network.

The Diff-Serv model safeguards the QoS by way of setting priorities. Though the model has a character of high efficiency in line utilization, its specific effect cannot be forecast. Therefore, for the Diff-Serv model of a backbone network, an independent bearer control layer is introduced, and a special Diff-Serv QoS signaling mechanism is set up. Besides, a resource management layer is established specially for networks based on the Diff-Serv model to manage the topology resources of the networks. This method of resource management based on the Diff-Serv model is so called a Diff-Serv model with an independent bearer control layer. FIG. 1 is a map of a Diff-Serv model with an independent bearer control layer. As shown in FIG. 1, in this model, a bearer control layer 102 is set up between a bearer network 103 and a service control layer 101. A Call Agent (CA) in the service control layer 101 is a server, e.g., a soft switching device which can implement soft switching functions etc. In the bearer control layer 102, there is one or more bearer network resource managers responsible for configuring management rules and network topology, distributing resources for service bandwidth applications of users, controlling and managing such information transferred via signaling between various bearer network resource managers as requests and results of users' service bandwidth applications, routes and paths assigned for service applications, e.g., controlling and managing the communications between bearer network resource manager 1, bearer network resource manager 2 and bearer network resource manager 3. In bearer network 103, each bearer network resource manager is in charge of a certain area of the bearer network which is called an administration domain of the corresponding bearer network resource manager, such as administration domain 105 of bearer network resource manager 1, administration domain 106 of bearer network resource manager 2, and administration domain 107 of bearer network resource manager 3. Bearer network 103 includes Edge Routers (ER) e.g., ER 1 and ER 2, Border Routers (BR) e.g. BR 1, BR 2, BR 3, and BR 4, and Core Routers, e.g., Core Router 104. All the ERs, BRs, and Core Routers belong to the bearer network and can be called Connection Node (CN).

In a Diff-Serv model with an independent bearer control layer, each bearer network resource manager has been configured with management rules and network topology so that it is able to distribute service resources for users' service bandwidth applications. During the processing of a user's service bandwidth application by the bearer control layer, the bearer network resource manager first determines the current route of the user's service, and informs an ER that the service traffic should be transmitted along the determined route. At present, the process of transmitting the user's service traffic on the bearer network along the route determined by the bearer control layer is usually implemented by using the Multi-Protocol Label Switching (MPLS) technique, i.e., setting up an LSP (Label Switched Path) along the service traffic path designated by the bearer control layer with a resource reservation method and setting up an end-to-end LSP using a display route mechanism of Resource Reservation Setup Protocol with Traffic-Engineering Extensions (RSVP-TE) or Constrain-based Routing LDP (CR-LDP).

In the above method, end-to-end topology structures and resources status of the whole network should be known first so as to provide a strict guarantee for the end-to-end QoS. However, in the viewpoint of commerce and security, an independent operating network may not hope that any other independent operating network knows its local disposition and quality status of the network resources. So the application of the method is limited.

Currently, there are many other Diff-Serv models with an independent bearer control layer, such as a Bandwidth-agent model of a serving Quality-of-Service backbone (Qbone). FIG. 2 is a map of a Bandwidth-agent model of a serving Qbone. As shown in FIG. 2, the model sets up a corresponding bandwidth agent for each Diff-Serv administration domain such as bandwidth agents 1, 2 and 3. The bandwidth agent is in charge of dealing with bandwidth application requests from users' hosts, servers, or network maintenance personnel, and determining whether to ratify a user's bandwidth application according to the current resource reservation status, policies configured, and a Service Level Agreement (SLA) that a user has subscribed to. The internal structure of this bandwidth agent is shown in FIG. 3, including: an inter-domain interface, a user service interface, a policy interface, an interface of network management, a route information database, a database, an intra-domain interface, and a simple policy service module. This bandwidth agent records various static or dynamic information including configuration information of various kinds of SLAs, physical network topology information, configuration and policy information of routers, user authentication information, current resource reservation information, and information of network occupation status. Meanwhile, the bandwidth agent also records route information to determine the user's service traffic path and the location of a cross-domain downstream bandwidth agent. The Diff-Serv administration domains herein refer to administration domains A, B, and C shown in FIG. 2.

In this technical scheme, a bandwidth agent directly manages the routers' resources and configuration information in its administration domain, which may have problems of over complicated topology and management; meanwhile, as the bandwidth agent needs to record the dynamic route information of the local domain, there may also exist a problem that route tables have to be updated too frequently, which may lead to unstable network resource reservation Besides, it may be difficult to keep the service route determined by the bandwidth agent according to the dynamic route information of the local domain identical with the actual transmitting route of the service traffic.

SUMMARY OF THE INVENTION

The present invention provides a method for implementing resource management, to set up a service connection between a source user device and a destination user device, used among at least one border Call Agent (CA) and at least one bearer network resource manager.

Wherein each bearer network resource manager corresponds to one administration domain, each administration domain corresponds to at least one border CA and one or more bearer network resource managers, and the administration domain to which the source user device belongs corresponds to a source border CA and a source bearer network resource manager while the administration domain to which the destination user device belongs corresponds to a destination border CA and a destination bearer network resource manager.

The method for implementing resource management includes:

- sending, by the source border CA, a connection resource request to the source bearer network resource manger;
- determining, by each bearer network resource manager that has received the connection resource request, whether the bearer network resource manager itself is the destination bearer network resource manager, if yes, applying for connection resources for the service connection currently being set up and sending back a resource application response to the destination border CA; otherwise, preprocessing the resource application of the service connection currently being set up and returning a response of preprocessing to the border CA corresponding to the bearer network resource manager;
- sending, by each border CA that has received the response of preprocessing, the connection resource request to its next-hop border CA;
- sending, by each border CA that has received the connection resource request, a connection resource request to its corresponding bearer network resource manager; and
- each border CA which has received the resource application response judging whether the border CA itself is the source border CA, if yes, instructing the source bearer network resource manager to apply for resources for the service connection currently being set up; otherwise, instructing the corresponding bearer network resource manager to apply for resources for the service connection currently being set up, and then sending back the resource application response to its last-hop border CA.

In accordance with this invention, when setting up a cross-domain service connection, service route selections and service connection resource distributions/modifications/releases can be implemented by each domain's border CA and a specific bearer network resource manager, thus realizing transmitting QoS signaling under a circumstance that different operating networks connect with each other transparently, extending the existing signaling of application layers, such as Session Initiate Protocol (SIP)/H.248 signaling, decreasing the signaling demands of the bearer control layer, raising the possibility of interconnection and intercommunication to provide the most possible continuous QoS, and improving the QoS of service connections on the bearer network. Therefore, the method makes different domains that employ different QoS schemes connect with each other and has a good expandability.

DETAILED DESCRIPTION OF THE PREFERRED EMBODIMENTS

Figure 1:
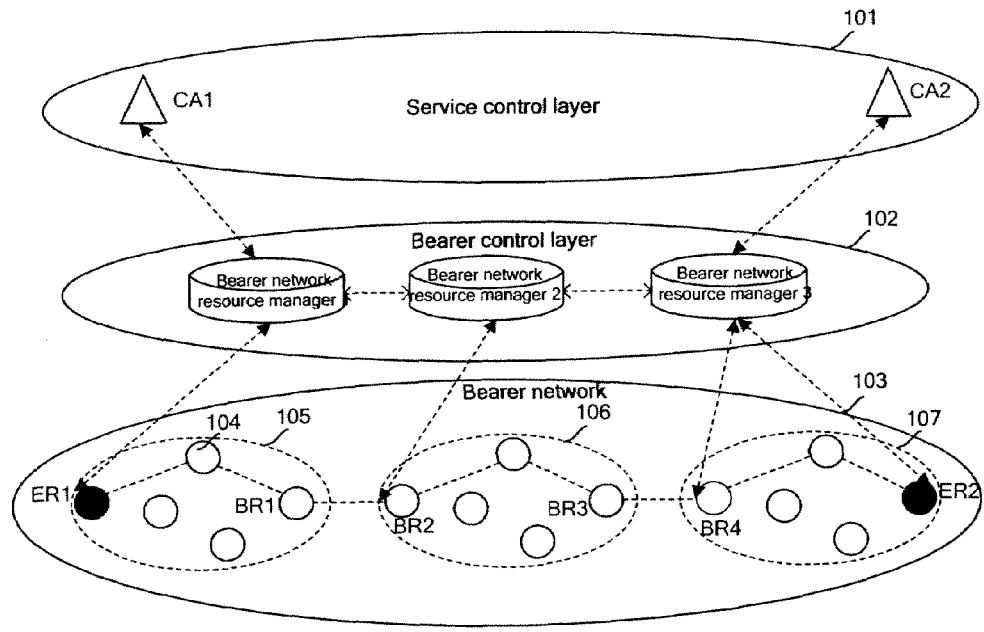
FIG. 1 is a map of a Diff-Serv model with an independent bearer control layer in the prior art.
Figure 2:
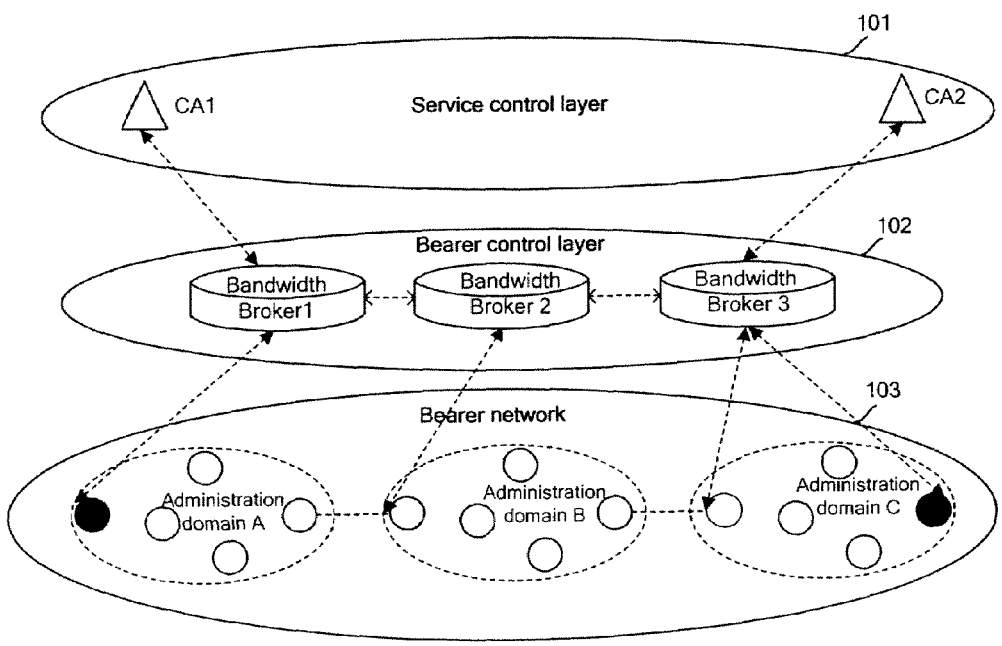
FIG. 2 is a map of a Bandwidth-agent model of a Qbone in the prior art.
Figure 3:
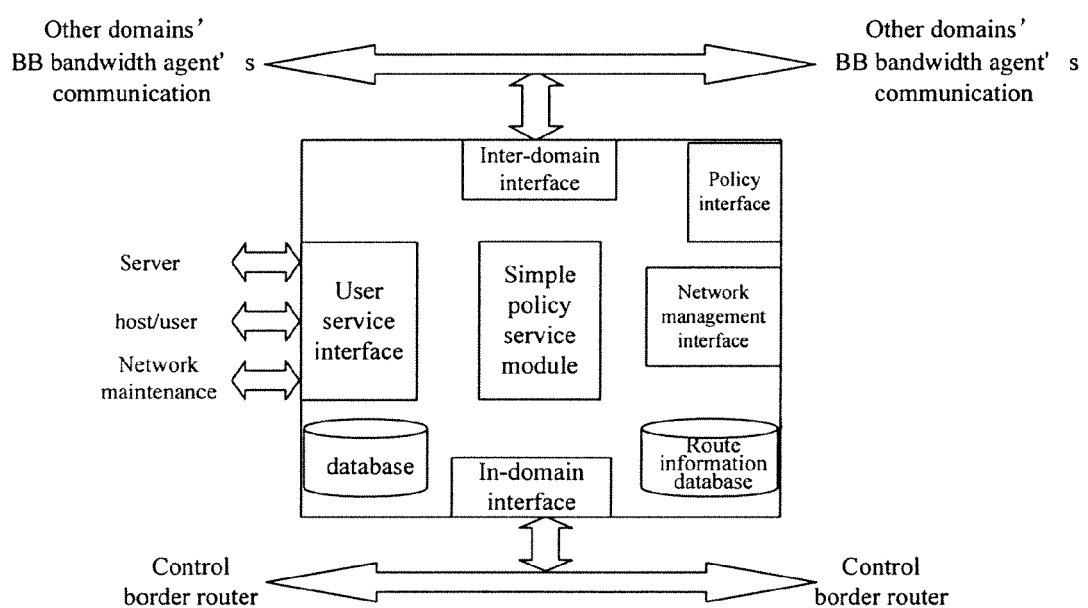
FIG. 3 is an internal structure map of the bandwidth agent in FIG. 2.

According to some embodiments of the present invention, the techniques provide a cross-domain signaling process for applications, modifications, and release of service route resources related to service connections. That is, for each domain, application for service routes, or modification and release of service connection resources are carried out only by a border CA and a specific bearer network resource manager of the domain. When requesting for service connection resources, the border CA first sends a connection resource request to a specific bearer network resource manager in its domain. This bearer network resource manager decides whether the destination user's device is in its administration domain, if yes, it makes an appropriate processing and returns a response of successful processing to the CA it belongs to; if not, the bearer network resource manager performs an appropriate preprocessing and sends back a response of successful preprocessing to the CA it belongs to, and after receiving the response, the CA sends a connection resource request to its next-hop CA.

The border CA mentioned above is a CA connected with CAs of other domains, and in each domain, there may be more than one border CA connecting with CAs of different domains, respectively. The specific bearer network resource manager is appointed by the CA and may be a bearer network resource manager which a source user's device belongs to or an entrance BR belongs to. The specific bearer network resource manager may connect directly or indirectly to a border CA. In one domain, if multiple border CAs are selected, all the CAs selected correspond to the same specific bearer network resource manager, or each of them corresponds to a specific bearer network resource manager, respectively. For example, one domain consists of five CAs: CA1-CA5, wherein CA1 and CA3 are border CA connecting to two domains, respectively, and CA1 and CA3 may correspond to one specific bearer network resource manager or two specific bearer network resource managers, respectively.

The domain mentioned here is a region which can be plotted in different ways. If the domain is plotted according to geographical locations, each domain corresponds to a geographical region, e.g., a province, city, district, or etc. If the domain is plotted based on service functions, each domain may correspond to a different special network, such as a finance or education network. And if the domain is plotted based on operators, each domain may correspond to a different independent operating network. Being cross-domain as mentioned above means that the source user's device and the destination user's device belong to different domains, so that, service connection resources should be distributed, modified, or released between CAs of different domains. The connection resource request can be a service route application request, service connection resource modification request, or service connection resource release request.

According to some embodiments of the present invention, the process corresponding to the current service connection resource request is accomplished by a border CA and a specific bearer network resource manager in each domain, e.g., selecting routes and distributing appropriate resources, or modifying/releasing the corresponding resources. If the corresponding process involves only the specific bearer network resource manager, the processing will be accomplished in the specific bearer network resource manager's own domain; if multiple bearer network resource managers are involved in the corresponding processing, the specific bearer network resource manager will not only perform the processing in its local domain but also make processing of the inter-domain resources between the specific bearer network resource manager and the bearer network resource managers it connects to, such as selecting an inter-domain route. On the basis of the determined specific bearer network resource manager of each domain, all the service route applications, service connection resource modifications, or service connection resources release between CAs are accomplished based on independent bearer network resource managers.

Each bearer network resource manager may adopt the same or different QoS algorithm to calculate service routes and required resources of the bearer layer under its administration for the current service connection resource application so as to select the best path for the current service connection. Here, calculating service routes refers to: the bearer network resource manager selecting service routes for the service connection request from a CA or adjacent network bearer resource manager to determine the intra-domain LSP and extra-domain LSP of the service traffic based on the intra-domain IP address, ER, BR topology, intra-domain LSP resources, extra-domain IP address, adjacent BR, bearer network resource manager topology, and extra-domain LSP resources.

For each bearer network resource manager, various existing intra-domain routing algorithms may be adopted to select service routes in its domain, such as setting up a matrix route table for each CN in the bearer network resource manager, and selecting the corresponding LSP based on the entrance router and exit router to realize the intra-domain route selection of each bearer network resource manager in the bearer control layer and accomplish the service's routing. In this way, each connection resource request will be tied up with a series of LSPs which will be released with other resources once the call is over. Similarly, the existing algorithms of inter-domain route selections may be used in the inter-domain route selection between bearer network resource managers. Besides, the existing methods may also be adopted in intra-domain and inter-domain resource distribution. The detailed schemes of route selection and resource distribution have been disclosed in other patent applications of the present applicant, so the specific description thereof is omitted here.

Figure 4:
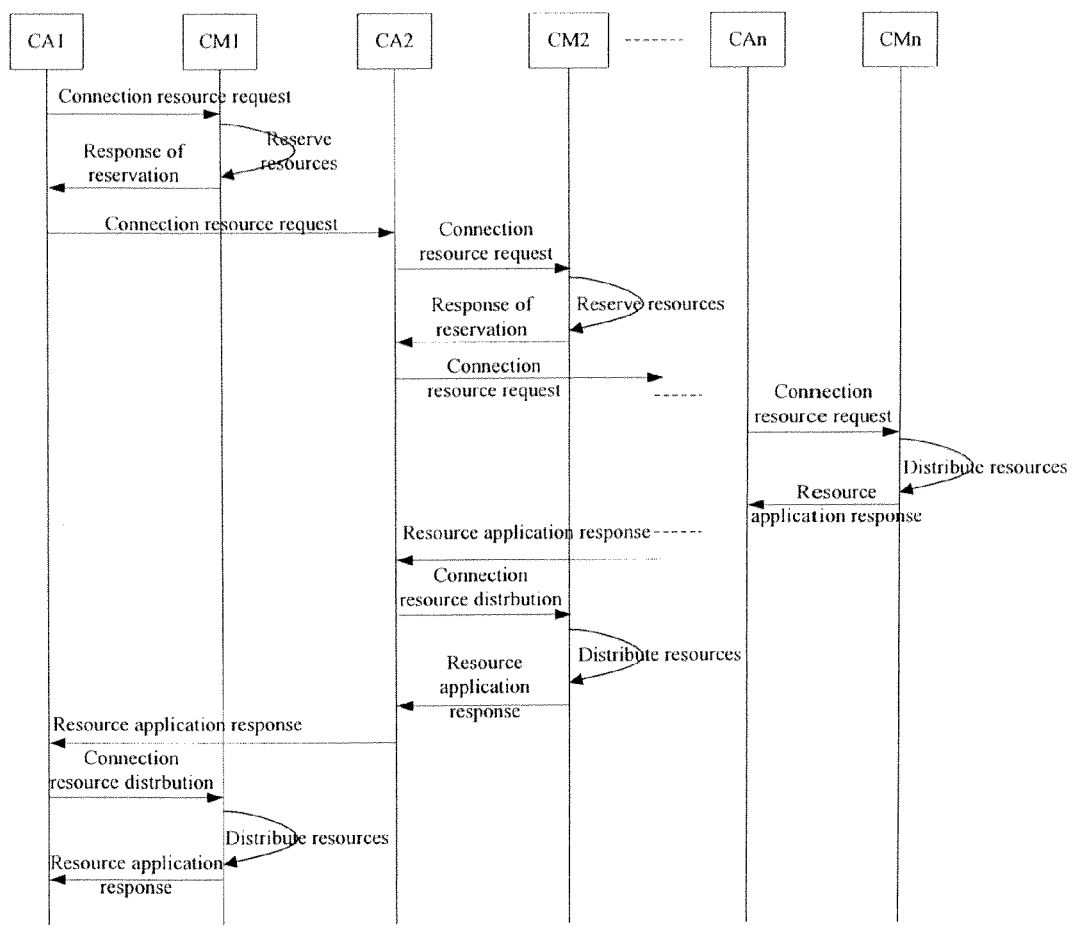
FIG. 4 is a flow chart of an embodiment in accordance with the present invention.

One embodiment of the present invention is shown in FIG. 4 in which a bearer network resource manager is represented by CM, each $CA_i$ is related to one $CM_i$, i is a positive integer from 1 to n, and each pair of CAi and $CM_i$ represents one domain. In FIG. 4, CA1 represents the CA to which the source user's device belongs, and $CA_n$ is the CA that the destination user's device belongs to. A service connection application is used as an example of a service connection resource request in FIG. 4. In the present embodiment, the reserved resources include route resources, bandwidth resources, and those necessary for service connections; accordingly, the resource distribution refers to selecting a route path and determining the occupied bandwidth resources. The method of resource management in this embodiment includes:

1) $CA_1$ initiates a connection resource request to CM1 after receiving a call request of a user's device, and stores connection information for the current service traffic. In this embodiment, $CM_1$ is the bearer network resource manager to which the user's device initiating the call request belongs.

Each of the other CAs initiates a connection resource request to its corresponding CM after receiving a connection resource request, and saves connection information for the current service traffic, wherein the corresponding CM of a CA refers to the specific bearer network resource manager of the domain which the CA belongs to, such as $CM_2, \ldots, CM_n$.

According to the source IP address of the quintuple in the received connection resource request, the source bearer network resource manager, $CM_1$, determines which ER the source IP address belongs to so as to select an intra-domain route by using a service route algorithm later.

For each of the bearer network resource managers except the source bearer network resource manager, the parameters carried in the connection resources request include entrance BR addresses of the administration domain of this bearer network resource manager, and the entrance BR addresses are determined during the route selection. For example, according to the hop-by-hop algorithm, the entrance BR addresses are determined after the last-hop CM selects an inter-domain LSP, i.e., the entrance BR addresses are an address sequence of the exit routers of the LSP. In this embodiment, $CM_2, \ldots, CM_n$ are bearer network resource managers to which an entrance BR belongs.

2) $CM_i$ selects intra-domain routes by using a service route algorithm, applies for intra-domain LSP resources, and records information of these LSP resources. The description is hereinafter given by taking $CM_1$ as an example, which is identical with the processing of any other CM.

3) $CM_1$ determines whether the destination user's device is in its own administration ration domain, if yes, distributes resources, delivers a QoS policy to the corresponding bearer network device, and returns a performing result to $CA_1$; otherwise, $CM_1$ returns to $CA_1$ a response of preprocessing, e.g., a response of successful reservation, carrying the QoS parameters and service type originally contained in the connection resource request. Obviously, if CA1 has reserved these parameters, it won't be necessary for this response to return such parameters to CA1. The response may also carry an address sequence of inter-domain routers and inter-domain SLAs selected in $CM_1$.

4) After receiving the response of successful reservation, $CA_1$ sends a connection resource request to its next-hop border CA, $CA_2$, the request containing an address sequence of BRs, SLAs, and QoS parameters. After receiving the connection resource request from the upstream $CA_1$, the next-hop border CA, $CA_2$, forwards the connection resource request to the corresponding $CM_2$ which will then find the BRs that connects with the routes under the administration of $CM_1$, and selects the appropriate entrance router according to the rules of the independent operating network and SLAs.

All the bearer network resource managers except the one to which the destination user's device belongs repeat Steps 1 to 4 until the connection resource request reaches $CM_n$ to which the destination user's device belongs.

5) The destination CM, $CM_n$, performs service routing, LSP resource distribution, and delivery of a QoS policy, and then, returns a resource application response to the corresponding $CA_n$. $CA_n$ then sends back a resource application response to the last-hop CA after receiving the resource application response.

6) Upon receiving the resource application response, the last-hop CA sends a message of connection resource distribution to the CM of its local domain. The CM then performs service routing, LSP resource distribution and delivery of a QoS policy, and returns a resource application response to the corresponding CA, and the CA sends back a resource application response to its last-hop CA after receiving the resource application response.

All the bearer network resource managers except the destination CM, CMn send their LSP resources to its last-hop CA together with the LSP resources returned by their next-hop bearer network resource manager via the resource application response, and these LSP resources are transmitted to the corresponding CM by the last-hop CA. The process will be repeated until the resource application response reaches $CM_1$.

7) $CM_1$ starts up a command of Stream mapping, delivers to the ER such information as a session ID, traffic information, QoS parameters, traffic description symbols, the label stack of the entire path, and etc.

The process of modifying or releasing service resources is similar to the above mentioned process.

In accordance with some embodiments of the present invention, the bearer networks under the administration of bearer network resource managers not only refer to MPLS networks, but also refer to other networks supporting Traffic Engineering, such as Asynchronous Transfer Mode (ATM) networks, optical networks, and etc. The intra-domain path algorithm is not limited to the hop-by-hop path algorithm, and it may be other QoS algorithms.

In a network between inter-domain routers, if the network doesn't support SLAs or QoS, tunnels or Diff-Serv Code Point (DSCP) based on the IP TOS/Diff-Serv model can be used to classify and forward the traffic.

Between the bearer network resource managers, a certain specific protocol can be used as the signaling in distributing, modifying, and releasing service connection resources as well as in the maintenance of the bearer control layer.

To sum up, the foregoing is only embodiments of this invention and not for limiting the protection scope thereof as detailed in the following claims.

The invention claimed is:

1. A method for implementing resource management, for setting up a service connection between a source user device and a destination user device, used among at least one border Call Agent (CA) and at least one bearer network resource manager, wherein each bearer network resource manager corresponds to one administration domain, each administration domain corresponds to at least one border CA and one or more bearer network resource managers, and the administration domain to which the source user device belongs corresponds to a source border CA and a source bearer network resource manager while the administration domain to which the destination user device belongs corresponds to a destination border CA and a destination bearer network resource manager, comprising:

sending, by the source border CA, a connection resource request to the source bearer network resource manager;

determining, by each bearer network resource manager that has received the connection resource request, whether the bearer network resource manager itself is the destination bearer network resource manager, if yes, applying for connection resources for the service connection currently being set up and sending back a resource application response to the destination border CA, otherwise, preprocessing the resource application of the service connection currently being set up and returning a response of preprocessing to the border CA corresponding to the bearer network resource manager;

sending, by each border CA that has received the response of preprocessing, the connection resource request to its next-hop border CA;

sending, by each border CA that has received the connection resource request, a connection resource request to its corresponding bearer network resource manager; and each border CA which has received the resource application response judging whether the border CA itself is the source border CA, if yes, instructing the source bearer network resource manager to apply for connection resources for the service connection currently being set up, otherwise, instructing the corresponding bearer network resource manager to apply for resources for the service connection currently being set up, and then sending back the resource application response to its last-hop border CA.

2. The method according to claim 1, wherein each border CA sending a connection resource request to its corresponding bearer network resource manager further comprises saving connection information of current service traffic by the border CA.

3. The method according to claim 1, wherein applying for connection resources for the service connection currently being set up comprises performing service routing, distributing Label Switch Path (LSP) resources, and delivering Quality of Service (QoS) policies to a bearer network device.

4. The method according to claim 1, wherein the connection resource request contains a sequence of border router addresses, Service Level Agreement (SLA), and QoS parameters.

5. The method according to claim 1, wherein preprocessing the resource application of the service connection currently being set up comprises selecting routes and reserving bandwidth resources.

6. The method according to claim 1, wherein the administration domain is a geographical region, a specialized network, or an independent operating network.

7. The method according to claim 1, wherein all the border CAs corresponding to one administration domain correspond to one bearer network resource manager.

8. The method according to claim 1, wherein all the border CAs corresponding to one administration domain correspond to their own bearer network resource managers, respectively.

9. The method according to claim 1, wherein the connection resource request is a service route application request, a service connection resource modification request, or a service connection resource release request.

10. The method according to claim 1, wherein the bearer network resource manager corresponding to the border CA is the bearer network resource manager to which an entrance border router (BR) of the administration domain corresponding to the border CA belongs.

11. The method according to claim 7, wherein the bearer network resource manager corresponding to the border CA is the bearer network resource manager to which an entrance border router (BR) of the administration domain corresponding to the border CA belongs.

12. The method according to claim 8, wherein the bearer network resource manager corresponding to the border CA is the bearer network resource manager to which an entrance border router (BR) of the administration domain.

* * * * *